Oct. 9, 1934.     H. WARREN     1,975,995
SOLE FITTING MACHINE
Filed March 17, 1932     3 Sheets-Sheet 1

INVENTOR
Harold Warren
By his Attorney
Victor Coll

Oct. 9, 1934.   H. WARREN   1,975,995
SOLE FITTING MACHINE
Filed March 17, 1932   3 Sheets-Sheet 2

INVENTOR
Harold Warren
By his Attorney
Victor Cobb

Oct. 9, 1934.   H. WARREN   1,975,995
SOLE FITTING MACHINE
Filed March 17, 1932   3 Sheets-Sheet 3
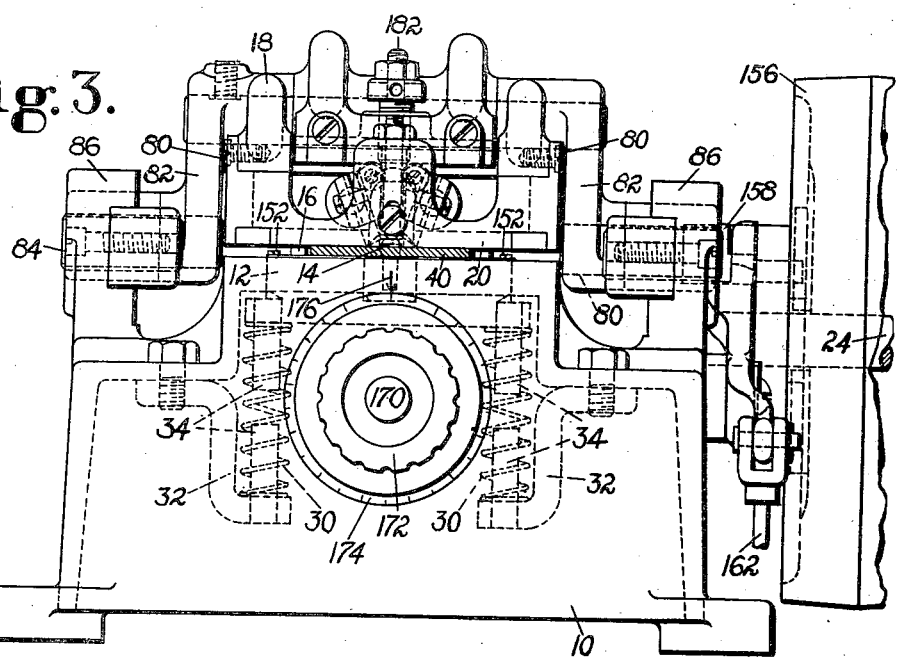
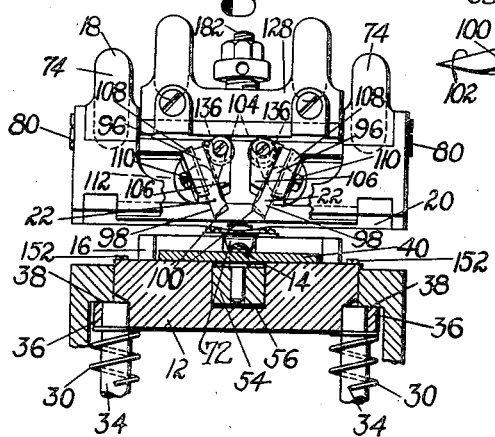
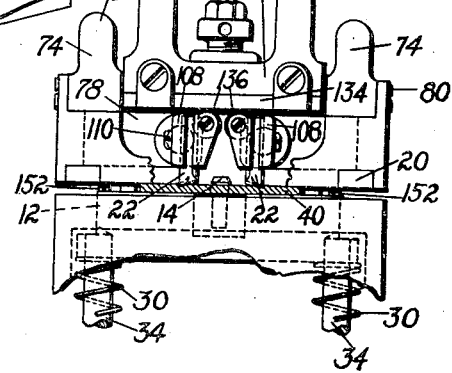
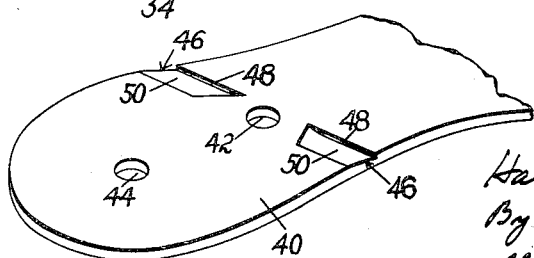
INVENTOR
Harold Warren
By his Attorney
Victor Cobb Patented Oct. 9, 1934

1,975,995

UNITED STATES PATENT OFFICE 1,975,995

SOLE FITTING MACHINE

Harold Warren, Swampscott, Mass., assignor to United Shoe Machinery Corporation, Paterson, N. J., a corporation of New Jersey Application March 17, 1932, Serial No. 599,429

23 Claims. (Cl. 12—17)

This invention relates to improvements in sole fitting machines and is herein illustrated as embodied in a machine for fitting or preparing insoles in a manner to predetermine the locations of the rear extremities of lips to be formed in the insole for the purpose of providing for the reception of fastenings for securing the insole to the upper of a shoe.

In United States Letters Patent No. 1,113,544, granted October 13, 1914, in the name of Miller Cook, Jr., there is disclosed and claimed a sole cutting and marking machine which operates to slit the lip of a channeled sole transversely to define the rear extremities of the lip and to locate them accurately in a desired relation to the heel portion of the insole and also to apply size and width markings to the insole.

One object of the present invention is to provide an improved machine of the type disclosed in the Letters Patent above referred to which will be adapted to operate upon an insole prior to the performance of a channeling or lip cutting operation in such a manner that not only will the locations of the rear extremities of the lip or lips of the insole be accurately determined but also the channeling operation as well as various subsequent shoemaking operations will be facilitated and a superior shoe produced.

To the accomplishment of this object one feature of the invention consists in the provision, in a sole fitting machine, of means for supporting and positioning a sole, and a cutter having a cutting edge extending lengthwise of the sole, the cutter and the sole supporting and positioning means being relatively movable in a direction transverse to one face of the sole to cut a recess inwardly from that face and also in a direction parallel to that face to extend the recess to the edge of the sole. As illustrated, two cutters are employed each having a cutting edge which is substantially perpendicular to the surface of a table upon which the sole is supported and another cutting edge which is inclined to the surface of the table and the cutters are moved first through arcuate paths and in directions away from each other to cut recesses at points separated widthwise of the sole and thereafter in straight paths and in directions away from each other to extend the recess to the sole edge at opposite sides of the sole. As shown, means is provided for positioning the sole so that the recesses will be located approximately at the junction of the heel and shank portions of the sole so as to be substantially in line with the breast of the heel of a shoe in which the insole is to be incorporated. Preferably, also, the recesses are cut to a depth equal to the depth to which the lip cut is subsequently to be made in the sole, thus enabling the lip cutting knife or knives of the channeling machine to enter one recess to start the lip cutting operation at one side of the shank of the sole without "cutting in" through the surface of the sole and to enter the other recess to terminate the lip cutting operation at the opposite side of the shank of the sole without "cutting out" through the surface of the sole. Thereby, provision is made for avoiding creating conditions at the rear extremities of the lip cuts which may be disadvantageous for reasons which will hereinafter be explained. Moreover, the presence of the recesses permits the overlasted margins of the upper and counter to be fitted more closely to the last in the vicinity of the heel breast line of the shoe and enables the butted ends of the welt to be drawn in so that the welt will lie straight as is desired along the shank.

Inasmuch as the thickness of the materials to be received in the recesses is substantially the same regardless of the thickness of the particular soles being employed in the shoes, it is desirable that the recesses shall be cut to a substantially uniform depth in all soles irrespective of any variations which may occur in the thickness of the soles. To the accomplishment of this result, in the illustrated machine, the sole supporting table is yieldingly mounted and the sole is clamped against the support, before the recesses are cut therein, by means of a clamping head which is arranged to be depressed to a predetermined level, the sole support being adapted to yield to the pressure of the clamping means to accommodate soles of different thicknesses but being capable of withstanding the pressure of the recess-forming means.

The illustrated machine is provided also with means for making an identifying mark such as a size or width mark in the bottom or grain side of the sole and, as shown, a presser member is carried by the clamping head for pressing the sole against the marking means to insure efficient operation of the latter.

The invention will be explained with reference to the accompanying drawings, in which Fig. 1 is a view in side elevation of a machine embodying the present invention;

Fig. 3 is a view in front elevation of the machine;

Fig 4 is a fragmentary view, partially in front elevation and partially in section, of a portion of the machine showing the knives in inoperative position;

Fig. 5 is a view similar to Fig. 4 but showing the knives as they appear after they have cut into the work but before they have completed their gouging operations;

Fig. 6 is a perspective view of one of the gouging knives; and

Fig. 7 is a perspective view of a portion of an insole showing the recesses formed therein by means of the gouging knives.

Figure 1:
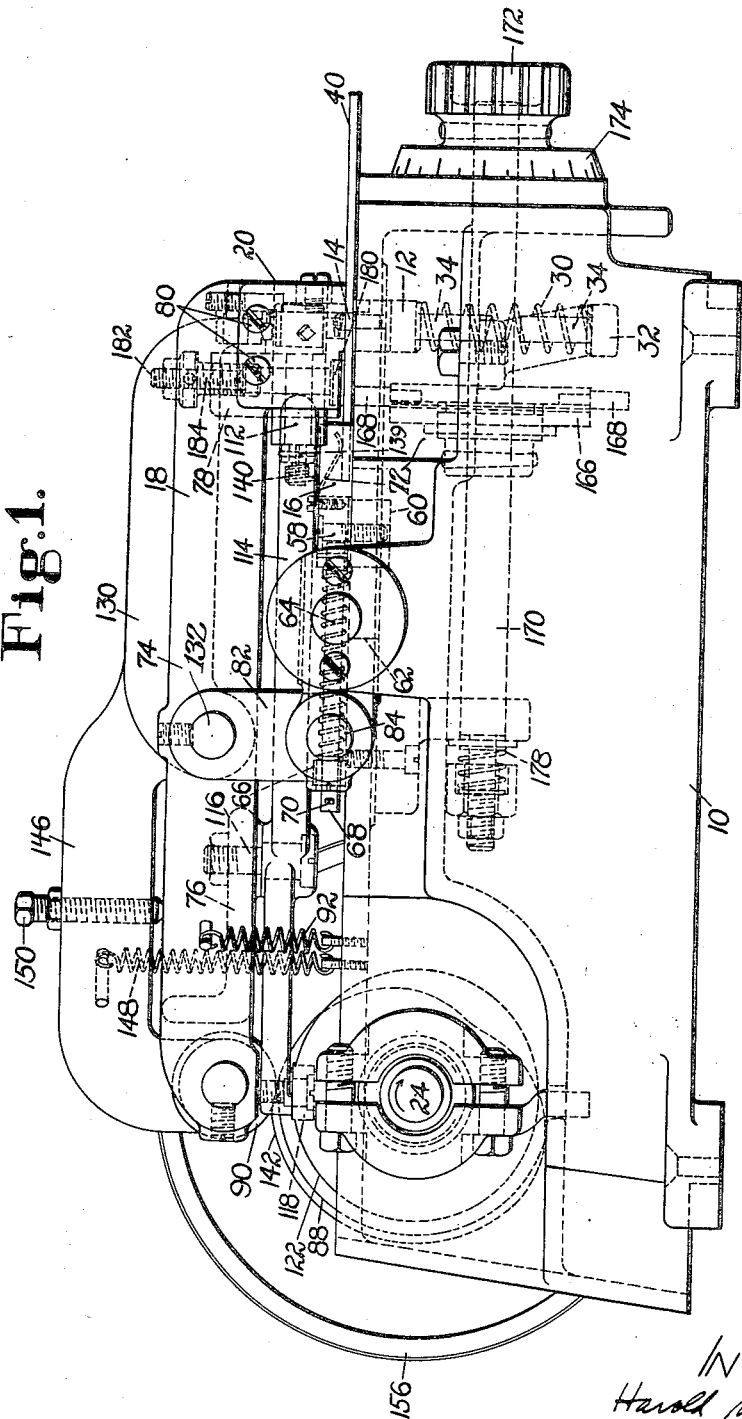

Referring to the drawings, the illustrated machine comprises a hollow, substantially rectangular base 10; a work supporting table 12 which is yieldingly mounted in the base 10; sole positioning devices consisting of a fixed pin 14 and a yielding fork 16 both of which are supported upon the base 10; an oscillatory frame 18 which is located above the base 10 and carries a clamping head 20 for cooperating with the yielding table 12 to hold the work while it is being operated upon; two gouging knives 22, 22 which are carried by the oscillatory frame 18 and are mounted for operative movements relatively to the frame; a camshaft 24 which is mounted in the base 10 and is provided with cams for operating the clamping head 20 and the knives 22; and a size marking device 166 which is mounted within the base 10.

The work table 12 is located beneath gouging cutters or recess-forming tools in the form of knives 22 and serves to support the portion of the work which is being acted upon by the knives. As shown, the work table rests upon the upper ends of two coiled springs 30, the lower extremities of which are supported by brackets 32 which are fixedly secured to the base 10, the springs being held in place by means of pins 34 which project from the table and from the brackets 32 into the coils of the springs. The springs 30 tend to hold the table with its upper surface slightly above the upper surface of the base 10, as shown in Fig. 4, this position being determined by engagement of lugs 36 on the table with shoulders 38 formed on the inside of the base 10 (see Fig. 4).

The illustrated machine is particularly designed to operate upon an insole, such as the insole 40 shown in Fig. 7, which is characterized by having at the rear of its shank portion one or more jig holes, such as the holes 42, 44, which are located in predetermined relation to the edge of the insole, an insole of this type being disclosed and claimed in United States Letters Patent No. 1,706,504, granted March 26, 1929, in the name of G. E. Warren.

An insole of the type referred to, which is to be operated upon, is introduced between the work table 12 and the clamping head 20 with the portion of the sole in the vicinity of the breast line resting upon the table 12 and, after the insole has been clamped to the table by the clamping head 20, the knives 22, 22 are actuated to form recesses therein, such as the recesses 46, Fig 7. As shown, each recess 46 is defined by a horizontally elongated vertical shoulder 48 which extends inwardly from the sole edge substantially at right angles thereto, and by a surface 50 which slopes rearwardly and upwardly from the bottom of the shoulder 48. In order that the recesses 46 shall be located in the desired relation to the insole means is provided for positively locating the portion of the insole which is to be operated upon both longitudinally and transversely relatively to the knives, and for gaging the horizontal angular position of the sole so that the recess shoulders 48 shall extend in the desired substantially perpendicular relation to the sole edge.

Figure 2:
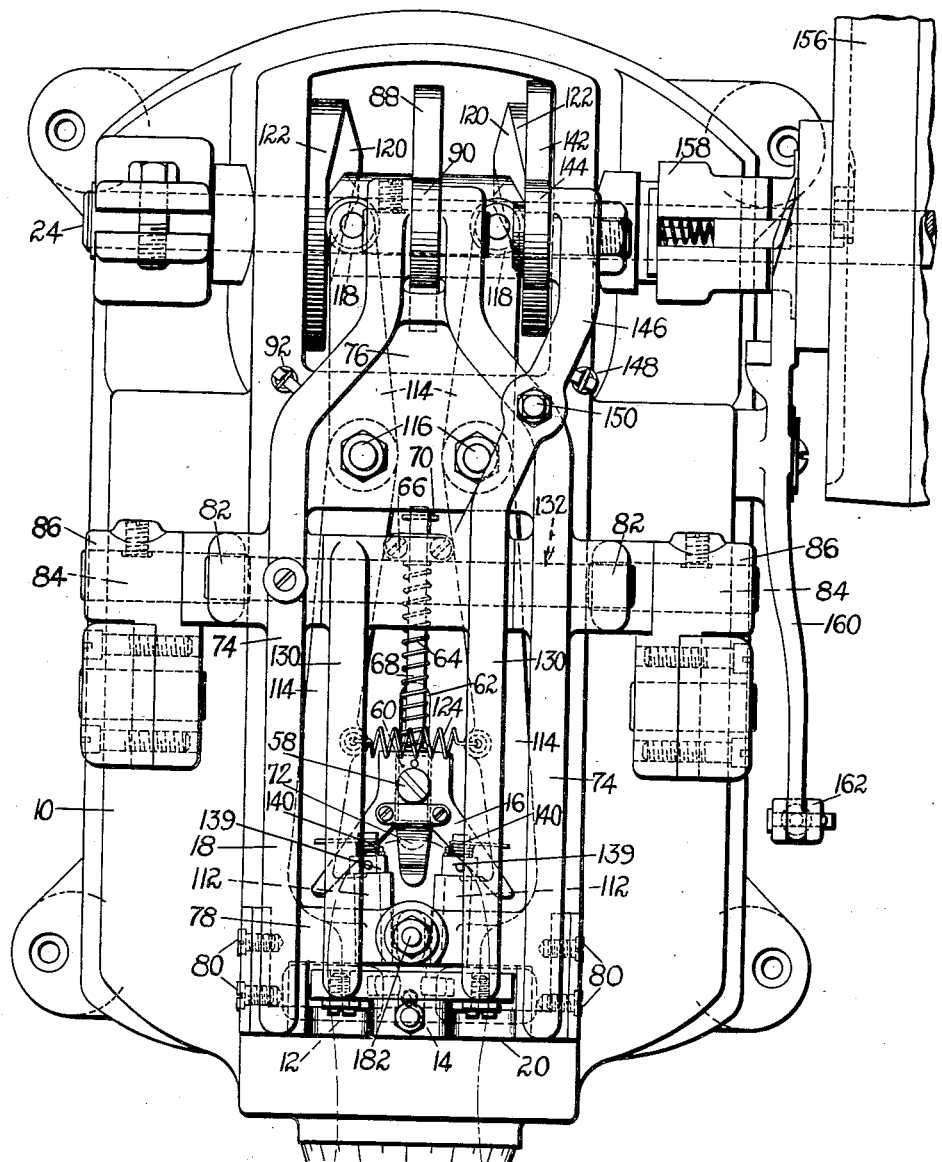
Fig. 2 is a top plan view of the machine.

To this end the fixed pin 14 is arranged to enter the foremost jig hole 42 in the insole while the fork 16 is arranged to engage the edge of the heel end of the sole. The pin 14, which is shaped to fit the jig hole 42, projects upwardly from a fixed portion 54 (Fig. 4) of the upper wall of the hollow base 10, the table 12 being cut away, as indicated at 56, to permit the pin 14 to engage the jig hole. The fork 16 is shaped and located as best shown in Fig. 2 to engage the sole edge at points equidistant from the central median line of the heel portion of the sole. Inasmuch as the distance between the jig hole 42 and the rear edge of the insole varies in different sizes of insoles, the fork 16 is yieldingly mounted so that it may accommodate itself to soles of different sizes. To this end the fork 16 is secured by a screw 58 to a block 60 which is mounted to slide in a slot 62 and the block 60 is urged forwardly in the slot by a spring 64 arranged to bear at one end against the block and at the opposite end against a block 66 secured to the base 10. A rod 68 extends rearwardly from the fork 16 through the coils of the spring 64 and through a bore in the block 66 and is provided rearwardly of the block with a cotter pin 70 which serves to limit the forward movement of the fork under the influence of the spring. A spring finger 72 extends forwardly from the fork 16 to overlie the heel end of the sole to hold it yieldingly against the table.

After an insole has been positioned upon the table by the cooperation of the pin 14 and the fork 16 the clamping head 20 is caused to descend to clamp the work against the table and to lower the knives 22 into positions to begin their cutting operations. The oscillating frame 18 which supports the clamping head and the knives comprises two spaced arms 74 which are connected at their ends by a web 76 and at their forward portions by a crossbar 78 and by the clamping head itself, the latter being secured to the arms 74 by means of screws 80. The arms 74 of the frame 18 are formed with centrally disposed downward extensions 82 which are mounted to turn upon horizontal studs 84 carried by brackets 86 that are affixed to the base 10. The frame 18 is adapted to be oscillated to move the clamping head 20 into and out of work holding position by means of a cam 88 on the cam shaft 24 arranged to engage a cam roll 90 carried by the frame 18 and held against the cam by a spring 92. As the clamping head 20 descends, the work is pressed against the work table 12 causing the latter to yield, thus compressing the stiff springs 30 and firmly clamping the work. It is to be observed that the clamping head is moved by the cam to the same clamping position or level irrespective of the thickness of the particular sole being operated upon and that variations in thickness of the work are compensated for by the yielding table, the latter being depressed a greater amount for a thick sole than for a thin sole. In this way the upper surfaces of all insoles are located at the same level whatever the thickness of the soles may be and consequently the knives, which are moved in paths bearing fixed relations to the clamping heads, will form recesses of equal depth whether the insoles are thin or thick.

Each knife 22 comprises a shank 96 (Fig. 6) having a cutting edge 98 at its lower portion for forming the shoulder cuts 48 of the recess 46 in the insole and a blade 100 which projects from the lower extremity of the shank 96 at a substantial angle thereto and is formed with a cutting edge 102 for forming the inclined surface 50 of the recess 46. Each knife shank 96 is adjustably clamped against an undercut shoulder 104 on a knife block 106 by means of a clamp plate 108 which is secured to the knife block by means of a screw 110. The knife blocks 106 are fixedly secured to the front ends of shafts 112 which are mounted to turn in bearings formed at the front extremities of knife carrier arms 114 which are pivoted at 116 to the webs 76 of the frame 18. The knife carrier arms 114 are extended rearwardly of the pivots 116 to support cam rolls 118 that are arranged to be engaged by cam faces 120 formed on the sides of cam disks 122 on the cam shaft 24. The knife carrier arms 114 are connected by a spring 124 which serves to hold the cam rolls 118 against their respective cams. The cam faces 120 function to move the knives 22 away from each other so that they will cut toward the edges of the sole. Before the knives are thus moved away from each other, however, they are swung about the axes of the shafts 112 from the positions shown in Fig. 4 to the positions shown in Fig. 5 to cause the knives to bury themselves in the material of the sole to a depth equal to the maximum depth of the recess to be formed.

The means for swinging the knives 22 to cause them to enter the work comprises a crossbar 128 which connects the forward end of two arms 130 that are mounted to turn upon a rod 132 carried by the frame 18. The crossbar 128 is faced with a wear plate 134 arranged to engage rollers 136 which are carried by the knife blocks 106 and are offset inwardly with respect to the shafts 112 so that downward movement of the crossbar 128 will rock the knife blocks 106 and swing the knives away from each other into the positions in which they appear in Fig. 5. The knife block shafts 112 are retained in their bearings in the arms 114 by means of collars 139 on the rear ends of the shafts and the rollers 136 are held against the wear plate on the crossbar 128 by means of springs 140 arranged to act upon the collars 139. The crossbar 128 is actuated to swing the knives as above described by means of a cam 142 formed on the periphery of the cam disk 122 and arranged to engage a cam roll 144 (Fig. 2) carried by a rearward extension 146 of one of the arms 130. A spring 148 acting upon the extension 146 serves to hold the cam roll 144 against its cam surface 142. A stop screw 150 carried by the arm extension 146 is arranged to engage a portion of the frame 18 to determine the upper or inoperative position of the crossbar 128.

In order to insure that the cutting edges 102 of the knives shall not be injured by contact with the surface of the work table in case the machine should be operated when no insole has been placed upon the table stop screws 152 are arranged at opposite ends of the table in positions to be engaged by the clamping head so that even if there is no work on the table, the table will be depressed sufficiently to prevent engagement of the knife edges therewith.

The cam shaft 24 is adapted to be driven by means of a belt (not shown) arranged to pass over a pulley 156 that is loosely mounted upon the cam shaft and is adapted to be connected with the shaft by means of suitable clutch mechanism, such as that indicated at 158. As shown, the clutch 158 is arranged to be operated by means of a clutch lever 160 which is connected by a rod 162 with a foot treadle (not shown), the arrangement being such that upon depression of the treadle the pulley 156 will be clutched to the shaft 24 whereupon the cam shaft will be caused to make a single revolution, after which it is disconnected from the pulley 156.

In addition to the above-described means for cutting recesses, such as the recesses 46, in the flesh sides of soles, the illustrated machine is provided also with means for marking the opposite or grain sides of the soles to indicate the sizes of the soles. As shown, the size marking means comprises a wheel 166 bearing upon its periphery a plurality of impression dies 168. The wheel 166 is carried upon a horizontal shaft 170 which is journaled within the base 10. The shaft 170 is adapted to be turned to bring a desired die uppermost into marking position by means of a knob 172 at the front of the machine which is secured to the forwardly projecting end of the shaft 170. A disk 174 formed integrally with the knob 172 is provided with graduations corresponding to the size dies 168 for registering with a stationary index mark 176 (Fig. 3) to indicate which size die is uppermost and a spring 178 is arranged to exert a friction drag upon the shaft 170 to hold the shaft and size wheel in any position into which they may be turned. This size marking mechanism is similar to that employed for the same purpose in the machine disclosed in United States Letters Patent No. 1,113,544, hereinbefore referred to. The present machine may also be provided with means similar to that disclosed in said Letters Patent for impressing a width marking as well as a size marking upon the grain face of the sole, the width marking means being preferably arranged to impress the width mark in closely adjacent relation to the size mark. For cooperating with the uppermost size die, and with the operatively positioned width marking device if width marking means is incorporated in the machine to form impressions in the sole, a presser foot 180 (Fig. 1) is carried by the frame 18, the presser foot having a threaded shank 182 upon which is screwed a sleeve 184. The sleeve 184 is externally threaded and screwed into a tapped bore in the frame 18. The sleeve 184 is formed with a hexagonal upper portion adapted to receive a wrench by means of which the sleeve may be turned to raise or lower the presser foot 180 to insure proper penetration of the impressing dies. The adjustment of the presser foot may be changed to adapt the dies to operate efficiently upon soles of different thicknesses.

In order to adapt the machine to operate upon soles which are not provided with one or more jig holes such as the holes 42 and 44, the positioning pin 14 and the fork 16 may be removed from the machine and in place thereof the machine may be provided with sole positioning means similar to that disclosed in the above-mentioned Letters Patent No. 1,113,544, said mechanism including an end gage which may be made automatically adjustable in the direction of the length of the sole by means of cam connections between the end gage and the size wheel shaft as disclosed in said patent.

In the use of the above-described machine the heel portion of an insole, such as the insole 40, is introduced between the clamping head 20 and the yielding table 12, with the rear edge of the insole against the arms of the yielding fork 16 and with the jig hole 42 engaged by the pin 14. The pin 14 and the fork 16 position the insole with respect to the knives 22 so that the two elongated recesses 46 which are to be cut by the latter will extend crosswise of the insole with the shoulders 48 positioned so that when the insole has been incorporated in a shoe the shoulders 48 will be approximately in line with the breast of the heel. The clutch 158 is then operated to start the machine under power. At the beginning of the cycle of operations of the machine, the clamping head 20 is lowered to a predetermined level, clamping the sole firmly against the table 12 which yields to accommodate itself to the thickness of the particular sole which is to be operated upon. The crossbar 128 is then lowered to rock the knife blocks 106 so as to swing the knives 22 from the positions shown in Fig. 4 to the positions shown in Fig. 5. The springs 30 are stiff enough to withstand the downward thrust of the knives without yielding and accordingly the knives, which are swung in opposite directions, cut into the upper face of the sole, the arrangement being such that the knives penetrate to a depth equal to the thickness of the lip or lips to be subsequently formed in the insole. The knife arms 114 are next operated to move the knife blocks in a horizontal plane to extend the knife cuts outwardly to the sole edge at opposite sides of the shank of the sole. The knives are then returned to their normal positions and the clamping head is raised to release the work which may then be removed from the machine by the operator.

The recesses 46 thus formed in the insole provide vertical shoulders 48 which extend substantially at right angles to the sole and serve to define accurately the rear ends of a lip or a lip and channel flap subsequently to be formed in the insole. The recesses permit the lip-forming knife or knives of the channeling machine to begin and end operations upon the sole at points below the surface of the sole instead of "cutting in" and "cutting out" through the sole surface, thus avoiding the presence in the finished insole of short lip sections located rearwardly of the breast line such as are liable to be turned up with the main portion of the lip and to form protuberances which tend to interfere with the proper seating of the heel. The recesses 46 also serve to receive the overlasted margins of the upper and counter, thus facilitating closer lasting of these parts in the vicinity of the heel breast line as well as to receive the butted ends of the welt so that the welt will be straight along the shank of the shoe.

Having described my invention, what I claim as new and desire to secure by Letters Patent of the United States is:

1. In a sole fitting machine, the combination with means for supporting and positioning a sole, of a cutter having a cutting edge extending lengthwise of a sole supported and positioned by said means, said cutter and said means being relatively movable in a direction transverse to one face of the sole to cut a recess inwardly from said face and also in a direction parallel to said face and transverse to the lateral edge of the sole to extend the recess to the edge of the sole.

2. In a sole fitting machine, the combination with means for supporting and positioning a sole, of a cutter having angularly disposed cutting edges, the cutter and said means being relatively movable in a direction transverse to one face of the sole to cut a recess inwardly from said face and also in a direction parallel to said face and substantially normal to the lateral edge of the sole to extend the recess to the edge of the sole.

3. In a sole fitting machine, the combination with a sole supporting table, of a cutter having a cutting edge in a plane substantially perpendicular to the surface of the table and another cutting edge inclined to the surface of the table, the cutter being movable in a direction transverse to said surface to cut a recess inwardly from the face of the sole and also in a direction parallel to said surface to extend the recess to the edge of the sole.

4. In a sole fitting machine, in combination, two recess-forming tools, and means for moving said tools first in directions away from each other and transverse to the face of a sole presented thereto to start the formation of two recesses in the sole and thereafter in opposite directions parallel to the face of the sole to extend the recesses outwardly to the sole edge.

5. In a sole fitting machine, in combination, means for supporting a sole in position to be operated upon, and two cutters movable through arcuate paths and in directions away from each other to cut recesses in the sole at points separated widthwise thereof and through straight paths and in directions away from each other to extend the recesses to the sole edge at opposite sides of the sole.

6. In a machine for preparing soles for lip cutting operations subsequently to be performed thereon, a sole support, and a cutter for recessing a sole on said support to a depth equal to that of a lip cut subsequently to be formed in the sole, said cutter being movable in an arcuate path to cut inwardly from the surface of the sole in a locality spaced from the sole edge and also in a straight path to extend the recessing cut to the edge of the sole.

7. In a sole fitting machine, in combination, two gouging cutters, and means for moving said cutters first in directions away from each other and transverse to the face of a sole presented thereto and thereafter in opposite directions in paths parallel to the plane of the face of the sole to form in the surface of the sole two recesses terminating in the sole edge at opposite sides of the sole.

8. In a sole fitting machine, in combination, a sole supporting table, and two knives mounted for swinging movements away from each other and toward said table to cut inwardly at separated localities in the surface of a sole on the table and also for movements away from each other in paths parallel to the surface of said table to extend the cuts outwardly toward the edge of the sole.

9. In a sole fitting machine, in combination, two gouging cutters, means for moving said cutters first in directions transverse to the face of a sole presented thereto and thereafter in directions parallel to the plane of the face of the sole to form in the surface of the sole two recesses terminating in the sole edge at opposite sides of the sole, and means for locating a sole relatively to the cutters to cause the recesses to be formed substantially at the junction of the heel and shank portions of the sole.

10. In a sole fitting machine, in combination, two gouging cutters, means for moving said cutters first in directions transverse to the face of a sole presented thereto and thereafter in opposite directions parallel to the plane of the face of the sole to form in the surface of the sole two elongated recesses extending crosswise of the sole and terminating at opposite points in the sole edge, and means for positioning the sole with the median line of its heel portion substantially at right angles to the paths to be traversed by the cutters in their final movements.

11. In a sole fitting machine, in combination, two gouging cutters, means for moving said cutters first in directions transverse to the face of a sole presented thereto and thereafter in opposite directions parallel to the plane of the face of the sole to form in the surface of the sole two elongated recesses extending crosswise of the sole and terminating at opposite points in the sole edge, a pin adapted to enter a jig hole in the sole to locate the sole longitudinally and transversely with respect to said cutters, and means for cooperating with said pin to determine the angular relation of the sole to the cutters.

12. In a sole fitting machine, in combination, two gouging cutters, means for moving said cutters first in directions transverse to the face of a sole presented thereto and thereafter in opposite directions parallel to the plane of the face of the sole to form in the surface of the sole two elongated recesses extending crosswise of the sole and terminating at opposite points in the sole edge, a pin adapted to enter a jig hole in the sole to locate the sole longitudinally and transversely with respect to said cutters, and a fork for engaging the sole edge at one end portion of the sole to cooperate with said pin to determine the angular relation of the sole to the cutters.

13. In a sole fitting machine, in combination, two gouging cutters, means for moving said cutters first in directions transverse to the face of a sole presented thereto and thereafter in opposite directions parallel to the plane of the face of the sole to form in the surface of the sole two elongated recesses extending crosswise of the sole and terminating at opposite points in the sole edge, a pin adapted to enter a jig hole in the sole to locate the sole longitudinally and transversely with respect to said cutters, a fork for engaging the sole edge at one end portion of the sole to cooperate with said pin to determine the angular relation of the sole to the cutters, and a spring finger on said fork arranged to overlie the sole to hold it yieldingly against the table.

14. In a sole fitting machine, in combination, two gouging cutters, means for moving said cutters first in directions transverse to the face of a sole presented thereto and thereafter in opposite directions parallel to the plane of the face of the sole to form in the surface of the sole two elongated recesses extending crosswise of the sole and terminating at opposite points in the sole edge, a pin adapted to enter a jig hole in the sole to locate the sole longitudinally and transversely with respect to said cutters, and a fork for engaging the sole edge at one end portion of the sole to cooperate with said pin to determine the angular relation of the sole to the cutters, said fork being mounted to yield in a direction lengthwise of the sole to accommodate itself to soles of different sizes.

15. In a sole fitting machine, in combination, two gouging cutters, means for supporting a sole to be operated upon by said cutters, and means for moving said cutters first through arcuate paths in opposite directions to cut inwardly from the surface of the sole and thereafter in opposite directions parallel to the plane of the face of the sole to continue the cuts outwardly to the sole edge to form two recesses in the sole.

16. In a sole fitting machine, in combination, a shoulder-forming cutter, a sole supporting table, means for clamping a sole upon the table, and means for moving the cutter toward the table to cut inwardly from the surface of the sole and thereafter in a direction parallel to the surface of the table and in a direction to form a shoulder cut extending outwardly to the lateral edge of the sole.

17. In a sole fitting machine, in combination, a sole support, a recessing tool movable toward said support, and a clamping head movable to a predetermined position to clamp a sole against the sole support, said support being mounted to yield to the pressure of the clamping head but to resist the thrust of the recess-forming tool.

18. In a sole fitting machine, in combination, a recessing tool, a sole supporting table, a clamping head movable toward the table to clamp a sole thereon, means for moving the clamping head to a predetermined clamping position, means for operating said tool to form a recess in the surface of the sole, and means for supporting said table constructed and arranged to yield to the pressure of the clamping head to accommodate soles of different thicknesses but being capable of withstanding the pressure of the recess-forming tool.

19. In a sole fitting machine, in combination, a sole supporting table, a head movable toward and from the table, means on said head for clamping a sole to the table, two knife arms mounted on said head for movements toward and from each other, knives mounted on said arms for movements in paths at right angles to the paths of movement of the arms to cut elongated recesses extending crosswise of the sole in the surface thereof, means for moving said head into position to clamp a sole on the table, means for moving said knives relatively to said arms to cut into the surface of the sole at points spaced inwardly from the sole edge, and means for moving the knife arms relatively to said head to complete the formation of said recesses.

20. In a sole fitting machine, in combination, a sole supporting table, a head movable toward and from the table, means on said head for clamping a sole to the table, and for forming an elongated recess in one face of the sole, means for marking the opposite face of the sole, a presser member carried by said head for pressing the sole against said marking means, means for moving said head to operatively position the clamping means and the recess-forming means, and other means for operating the recess-forming means.

21. In a sole fitting machine, a support for a sole, means for positioning a sole on said support and for clamping it thereto, a knife for forming a recess in the sole, a knife holder mounted to turn about an axis parallel to the face of the sole, a lever arm supporting the knife holder and movable in a plane parallel to the face of the sole, means for turning the knife holder to start the recess by cutting into the face of the sole, and means for swinging said lever arm to extend the recess to the lateral edge of the sole.

22. In a sole fitting machine, means for supporting the heel portion of a sole, means for positioning the heel portion of the sole, a clamping head movable to a predetermined position to clamp a positioned sole against said sole supporting means, gouging means for removing material from the upper surface of the sole to form separated recesses adjacent to the edges thereof, and means for applying an identifying mark to the positioned and clamped sole.

23. In a sole fitting machine, means for supporting and positioning the heel portion of a sole, a head movable toward and from the sole support for clamping the sole upon the support, and cutters shaped to form recesses in the sole by removing material therefrom, said cutters being mounted in the head and movable relatively thereto first downwardly to penetrate the upper surface of the sole at separate points spaced inwardly from the sole edge and thereafter outwardly to extend the cuts to the sole edge.

HAROLD WARREN.